(12) United States Patent
Zhang

(10) Patent No.: US 8,970,245 B2
(45) Date of Patent: Mar. 3, 2015

(54) PROBING DEVICE FOR TFT-LCD SUBSTRATE

(71) Applicant: Shenzhen China Star Optoelectronics Technology Co., Ltd., Shenzhen, Guangdong Province (CN)

(72) Inventor: Haijian Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 267 days.

(21) Appl. No.: 13/703,888

(22) PCT Filed: Oct. 12, 2012

(86) PCT No.: PCT/CN2012/082815
§ 371 (c)(1),
(2) Date: Dec. 12, 2012

(87) PCT Pub. No.: WO2014/047978
PCT Pub. Date: Apr. 3, 2014

(65) Prior Publication Data
US 2014/0085586 A1   Mar. 27, 2014

(30) Foreign Application Priority Data
Sep. 26, 2012   (CN) .......................... 2012 1 0363912

(51) Int. Cl.
*G01R 31/26* (2014.01)
*G01R 31/20* (2006.01)
*G02F 1/1345* (2006.01)

(52) U.S. Cl.
CPC .................................. *G02F 1/1345* (2013.01)
USPC ............. 324/760.02; 324/754.01; 324/755.01

(58) Field of Classification Search
CPC . G01H 1/003; G02F 1/1309; G02F 1/136259; G01N 2021/9513; G01N 21/9503; G06F 19/3418; G01R 19/0092; G01R 1/06733; G01R 1/0735; G01R 31/311
USPC ............. 324/754.07, 754.01, 754.03, 760.02, 324/537
See application file for complete search history.

(56) References Cited

U.S. PATENT DOCUMENTS 4,818,933 A * 4/1989 Kerschner et al. ....... 324/750.16
5,506,512 A   4/1996 Tozawa et al.
(Continued)

FOREIGN PATENT DOCUMENTS

| CN | 101995679 A | 3/2011 |
| CN | 201796208 U | 4/2011 |
| CN | 102539850 A | 7/2012 |
| CN | 102540509 A | 7/2012 |

*Primary Examiner* — Vinh Nguyen
(74) *Attorney, Agent, or Firm* — Cheng-Ju Chiang

(57) ABSTRACT

A probing device for a TFT-LCD substrate, which includes a device body, a device body, a circuit board mounted on the device body, a plurality of motors mounted on the device body, and a plurality of probe pins respectively mounted to the motors. The motors and the probe pins are arranged in a one-to-one corresponding manner. The circuit board includes a programmable logic controller and a man-machine interface terminal electrically connected to the programmable logic controller. The plurality of motors and the plurality of probe pins are electrically connected to the programmable logic controller. The plurality of probe pins is set at locations corresponding to locations of panel inspection signal input pads of TFT substrates of various sizes. The programmable logic controller uses the motors to control the elevation and lowering of the probe pins.

9 Claims, 1 Drawing Sheet

(56) References Cited

U.S. PATENT DOCUMENTS

| | | | |
|---|---|---|---|
| 7,317,326 B2* | 1/2008 | Nakano et al. | 324/762.09 |
| 7,355,418 B2* | 4/2008 | Brunner et al. | 324/750.25 |
| 8,547,130 B2* | 10/2013 | Sumi et al. | 324/760.01 |
| 2010/0155574 A1 | 6/2010 | Choi et al. | |

* cited by examiner

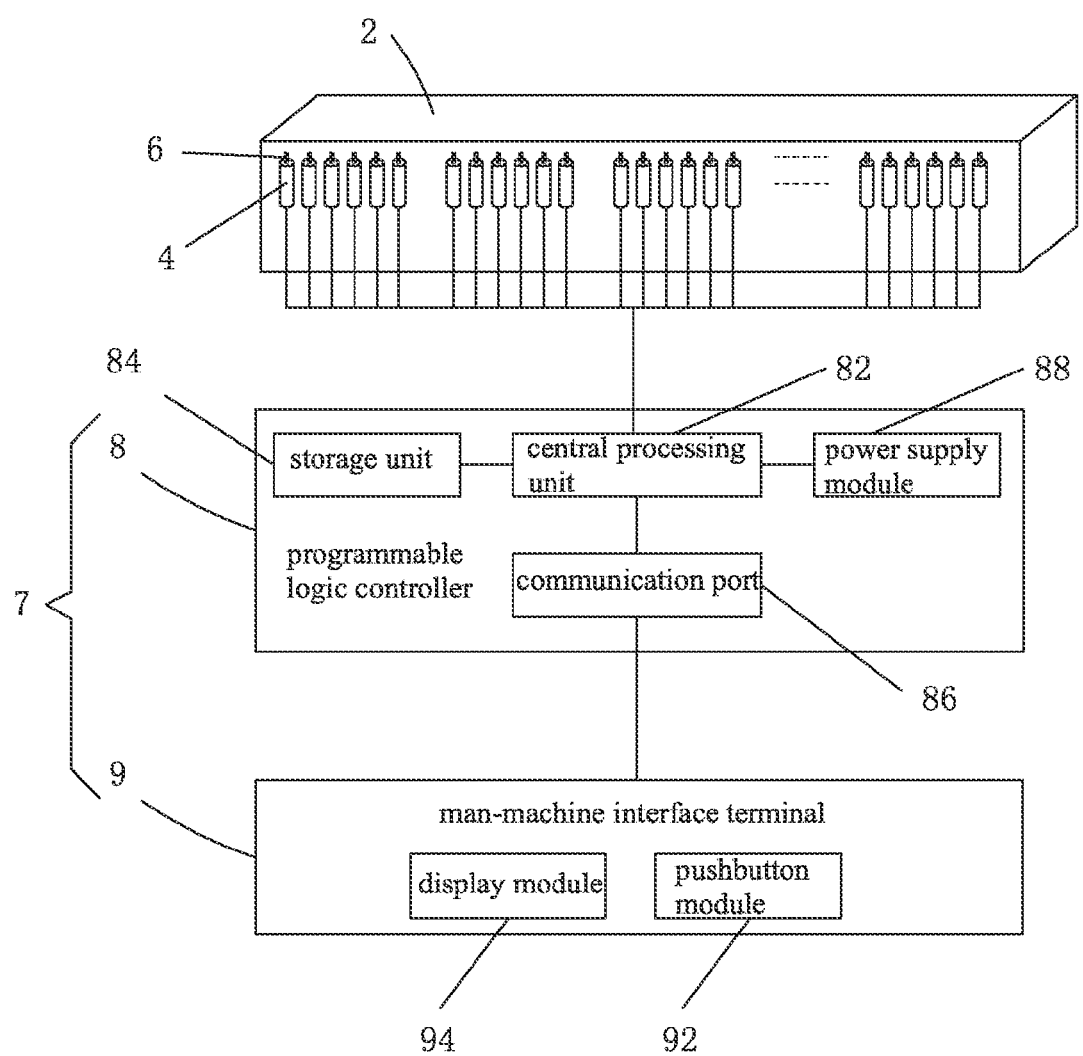

PROBING DEVICE FOR TFT-LCD SUBSTRATE

BACKGROUND OF THE INVENTION

1. Field of the Invention

The present invention relates to a probing technique of TFT-LCD (Thin-Film Transistor Liquid Crystal Display), and in particular to a pin structure of a probing device for a TFT-LCD substrate.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The operation principle of the liquid crystal display panel is that liquid crystal polymer molecules are interposed between two parallel glass substrates and the liquid crystal molecules are controlled to change direction by application of electricity to the glass substrates in order to refract light emitting from the backlight module for generating images.

A liquid crystal display panel is generally composed of an upper substrate (CF, Color Filter), a lower substrate (TFT, Thin Film Transistor), and liquid crystal (LC) interposed between the upper substrate and the lower substrate, and a sealant. A general manufacturing process comprises a front stage of array process (including thin film, yellow light, etching, and film stripping), an intermediate stage of cell process (including bonding TFT substrate and the CF substrate), and a rear stage of assembling process (including mounting drive ICs and printed circuit board). The front stage of array process generally makes the TFT substrate for controlling the movement of liquid crystal molecules. The intermediate stage of cell process generally introduces liquid crystal between the TFT substrate and the CF substrate. The rear stage of assembling process generally mounts the drive ICs and combining the printed circuit board to effect driving the liquid crystal molecules to rotate for displaying images.

The substrates that have received liquid crystal filled therein are irradiated by ultraviolet light (UV1) for alignment in a high voltage activated (HVA) process and are subjected to inspection by automated optical inspection (AOI) to identify the result of alignment. Both UV1 or AOI need a pin of a probe to contact, in a one by one manner, panel inspection signal input pads of the TFT substrate to apply a voltage to the liquid crystal. The probe comprises a block corresponding to the TFT substrate and the block carries a pin that corresponds to the panel inspection signal input pads of the TFT substrate in order to effect application of voltage. The currently used probe can be classified in two types:

(1) Elevating type probe: The probe is first moved to a location below a panel inspection signal input pad of the TFT substrate and then the probe is elevated until the pin contacts the panel inspection signal input pad of the TFT substrate. Afterwards, a voltage is applied to carry out the HVA process and the AOI inspection.

(2) Clamping type probe: The probe first elevated to the level of the TFT substrate and then the probe is moved forward to the location of the panel inspection signal input pad of the TFT substrate. Afterwards, upper and lower portions of the block simultaneously clamp the TFT substrate and the pin contacts the panel inspection signal input pad of the TFT substrate. A voltage is then applied to carry out the HVA process and the AOI inspection.

However, both the elevating type probe and the clamping type probe show the following shortcomings. Each probe can be operated to apply voltage to a specific size of the TFT substrate. Since different TFT substrates have different locations to receive the applied voltage, the makes it necessary for the location of the pin on the associated block to be different. Consequently, array checker facility must change probes for handling different sizes of the TFT substrates and the contact between the pin and the TFT substrate and output of voltage must be re-identified. This is a waste of production line time and causes an increased load to the production line and is susceptible to replacement of incorrect probes. In addition, potential risk of impact may occur in the process of probe replacement.

SUMMARY OF THE INVENTION

An object of the present invention is to provide a probing device for a TFT-LCD substrate, which meets the need for inspection of various sizes of the TFT substrate, increases the manufacturing efficiency of a production line, and eliminates the risk of impact currently existing in the replacement of probe.

To achieve the object, the present invention provides a probing device for a TFT-LCD substrate, which comprises a device body, a circuit board mounted on the device body, a plurality of motors mounted on the device body, and a plurality of probe pins respectively mounted to the motors. The motors and the probe pins are arranged in a one-to-one corresponding manner. The circuit board comprises a programmable logic controller and a man-machine interface terminal electrically connected to the programmable logic controller. The plurality of motors and the plurality of probe pins are electrically connected to the programmable logic controller. The plurality of probe pins is set at locations corresponding to locations of panel inspection signal input pads of TFT substrates of various sizes. The programmable logic controller uses the motors to control the elevation and lowering of the probe pins.

The programmable logic controller comprises a central processing unit, a storage unit electrically connected to the central processing unit, a communication port electrically connected to the central processing unit, and a power supply module electrically connected to the central processing unit. The plurality of motors and the plurality of probe pins are electrically connected to the central processing unit. The man-machine interface terminal is electrically connected by the communication port to the programmable logic controller.

The storage unit stores manners of motor driving corresponding to various sizes of the TFT substrate.

The man-machine interface terminal comprises a pushbutton module electrically connected to the central processing unit and a display module electrically connected to the central processing unit. The pushbutton module functions for setting and selecting the motor driving manners. The display module provides assistance to the setting and selecting of the motor driving manners.

The selection of the motor driving manners is carried out through a menu.

The motor driving manners are set up by sequentially numbering the plurality of motors and the plurality of probe pins.

The motor and the probe pin mounted on the motor that correspond to the location of the same panel inspection signal input pad are of the same number.

The motor driving manners are set up that numbering of the modes is made, according to the motors and the probe pins that correspond to different sizes of the TFT substrate so that the motors and the probe pins that correspond to the same size of the TFT substrate are grouped together as a mode. These modes are numbered by means of menus.

The present invention also provides a probing device for a TFT-LCD substrate, which comprises a device body, a circuit board mounted on the device body, a plurality of motors mounted on the device body, and a plurality of probe pins respectively mounted to the motors, the motors and the probe pins being arranged in a one-to-one corresponding manner, the circuit board comprising a programmable logic controller and a man-machine interface terminal electrically connected to the programmable logic controller, the plurality of motors and the plurality of probe pins being electrically connected to the programmable logic controller, the plurality of probe pins being set at locations corresponding to locations of panel inspection signal input pads of TFT substrates of various sizes, the programmable logic controller using the motors to control the elevation and lowering of the probe pins;

wherein the programmable logic controller comprises a central processing unit, a storage unit electrically connected to the central processing unit, a communication port electrically connected to the central processing unit, and a power supply module electrically connected to the central processing unit, the plurality of motors and the plurality of probe pins being electrically connected to the central processing unit, the man-machine interface terminal being electrically connected by the communication port to the programmable logic controller;

wherein the storage unit stores manners of motor driving corresponding to various sizes of the TFT substrate;

wherein the man-machine interface terminal comprises a pushbutton module electrically connected to the central processing unit and a display module electrically connected to the central processing unit, the pushbutton module functioning for setting and selecting the motor driving manners, the display module providing assistance to the setting and selecting of the motor driving manners;

wherein the selection of the motor driving manners is carried out through a menu;

wherein the motor driving manners are set up by sequentially numbering the plurality of motors and the plurality of probe pins;

wherein the motor and the probe pin mounted on the motor that correspond to the location of the same panel inspection signal input pad are of the same number; and wherein the motor driving manners are set up that numbering of the modes is made, according to the motors and the probe pins that correspond to different sizes of the TFT substrate so that the motors and the probe pins that correspond to the same size of the TFT substrate are grouped together as a mode, these modes being numbered by means of menus.

The efficacy of the present invention is that the present invention provides a probing device for a TFT-LCD substrate, which uses motors to control and drive probe pins corresponding to a TFT substrate to be inspected to ascend and, after the completion of the inspection, controls the probe pins to descend to finish the inspection of the TFT substrate. This satisfies the need of inspecting TFT substrates of various sizes, saves the time of production line in replacing probes, improves the efficiency of production line, lowers down the manufacturing cost, and eliminates the risk of impacts occurring in the existing process of replacing probe so as to further reduce the manufacturing cost to some extents.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawing. In the drawing:

The FIGURE is a schematic view showing the structure of a TFT-LCD probing device according to the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to the FIGURE, the present invention provides a probing device for a TFT-LCD (Thin-Film Transistor Liquid Crystal Display) substrate, which comprises a device body 2, a circuit board 7 mounted on the device body 2, a plurality of motors 4 mounted on the device body 2, and a plurality of probe pins 6 respectively mounted to the motors 4. The motors 4 and the probe pins 6 are arranged in a one-to-one corresponding manner. The circuit board 7 comprises a programmable logic controller 8 and a man-machine interface terminal 9 electrically connected to the programmable logic controller 8. The plurality of motors 4 and the plurality of probe pins 6 are all electrically connected to the programmable logic controller 8. The plurality of probe pins 4 is set at locations corresponding to the locations of panel inspection signal input pads of TFT substrates of various sizes. The programmable logic controller 8 uses the motors 4 to control the elevation and lowering of the probe pins 6. When the probing device is used to inspect TFT substrates that may of different sizes, corresponding ones of the probe pins 4 are driven to ascend and thus contact the panel inspection signal input pads of the TFT substrate for application of voltage to the liquid crystal.

The programmable logic controller 8 comprises a central processing unit 82, a storage unit 84 electrically connected to the central processing unit 82, a communication port 86 electrically connected to the central processing unit 82, and a power supply module 88 electrically connected to the central processing unit 82. The plurality of motors 4 and the plurality of probe pins 6 are both electrically connected to the central processing unit 82. The man-machine interface terminal 9 is electrically connected by the communication port 86 to the programmable logic controller 8. The storage unit 84 stores the manners of motor driving corresponding to various sizes of the TFT substrate, whereby the man-machine interface terminal 9 may set the motor driving manners and select the motor driving manners corresponding various sizes of the TFT substrate to carry out inspection.

The man-machine interface terminal 9 comprises a pushbutton module 92 electrically connected to the central processing unit 82 and a display module 94 electrically connected to the central processing unit 82. The pushbutton module 92 functions for setting and selecting the motor driving manners. The display module 94 provides assistance to the setting and selecting of the motor driving manners. The selection of the motor driving manners is carried out through a menu. For example, the display module 94 displays a list of menus and the currently selected menu and an operation is carried out through the pushbutton module 92 to complete the selection of a specific motor driving manner.

The motor driving manners are set up by sequentially numbering the plurality of motors 4 and the plurality of probe pins 6, such as being numbered as 1, 2, 3, 4, . . . . The motor 4 and the probe pin 6 mounted on the motor 4 that correspond to the location of the same panel inspection signal input pad are of the same number. Numbering of modes is made, according to the motors 4 and the probe pins 6 that correspond to different sizes of the TFT substrate so that the motors 4 and the probe pins 6 that correspond to the same size of the TFT substrate are grouped together as a mode. These modes are numbered by means of menus, whereby selecting the motor driving manner through the pushbutton module 92 is indeed to select the mode.

Specific steps will be described as follows:

(1) numbering the probe pins 6 and the motors 4 in such a way that motor 4 and the probe pin 6 mounted to the motor that correspond to the location of the same panel inspection signal input pad of a TFT substrate are assigned with the same number;

(2) indentifying the locations of the probe pins 6 according to the locations of the panel inspection signal input pads of the TFT substrates of various sizes and grouping the probe pins 6 and the motors 4 associated with the same size of the TFT substrate in a mode;

(3) setting up a desired mode through a menu and proceeding with mode numbering to thereby provide a motor driving manner; and (4) selecting a menu (namely selecting a motor driving manner) according to the size of the TFT substrate through the pushbutton module and controlling the motors 4 to drive the probe pins 6 to ascend by means of the programmable logic controller so that the corresponding probe pins 4 get contact with the panel inspection signal input pads of the TFT substrate and the probe pins 6 are conducted on to apply voltage to the liquid crystal display panel to complete the inspection.

In summary, the present invention provides a probing device for a TFT-LCD substrate, which uses motors to control and drive probe pins corresponding to a TFT substrate to be inspected to ascend and, after the completion of the inspection, controls the probe pins to descend to finish the inspection of the TFT substrate. This satisfies the need of inspecting TFT substrates of various sizes, saves the time of production line in replacing probes, improves the efficiency of production line, lowers down the manufacturing cost, and eliminates the risk of impacts occurring in the existing process of replacing probe so as to further reduce the manufacturing cost to some extents.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A probing device for a Thin-Film Transistor Liquid Crystal Display (TFT-LCD) substrate, comprising a device body, a circuit board mounted on the device body, a plurality of motors mounted on the device body, and a plurality of probe pins respectively mounted to the motors, the motors and the probe pins being arranged in a one-to-one corresponding manner, the circuit board comprising a programmable logic controller and a man-machine interface terminal electrically connected to the programmable logic controller, the plurality of motors and the plurality of probe pins being electrically connected to the programmable logic controller, the plurality of probe pins being set at locations corresponding to locations of panel inspection signal input pads of TFT substrates of various sizes, the programmable logic controller using the motors to control the elevation and lowering of the probe pins.

2. The probing device for a TFT-LCD substrate as claimed in claim 1, wherein the programmable logic controller comprises a central processing unit, a storage unit electrically connected to the central processing unit, a communication port electrically connected to the central processing unit, and a power supply module electrically connected to the central processing unit, the plurality of motors and the plurality of probe pins being electrically connected to the central processing unit, the man-machine interface terminal being electrically connected by the communication port to the programmable logic controller.

3. The probing device for a TFT-LCD substrate as claimed in claim 2, wherein the storage unit stores manners of motor driving corresponding to various sizes of TFT substrate.

4. The probing device for a TFT-LCD substrate as claimed in claim 2, wherein the man-machine interface terminal comprises a pushbutton module electrically connected to the central processing unit and a display module electrically connected to the central processing unit, the pushbutton module functioning for setting and selecting the motor driving manners, the display module providing assistance to the setting and selecting of the motor driving manners.

5. The probing device for a TFT-LCD substrate as claimed in claim 4, wherein the selection of the motor driving manners is carried out through a menu.

6. The probing device for a TFT-LCD substrate as claimed in claim 3, wherein the motor driving manners are set up by sequentially numbering the plurality of motors and the plurality of probe pins.

7. The probing device for a TFT-LCD substrate as claimed in claim 6, wherein the motor and the probe pin mounted on the motor that correspond to the location of the same panel inspection signal input pad are of the same number.

8. The probing device for a TFT-LCD substrate as claimed in claim 7, wherein the motor driving manners are set up that numbering of the modes is made, according to the motors and the probe pins that correspond to different sizes of TFT substrate so that the motors and the probe pins that correspond to the same size of TFT substrate are grouped together as a mode, these modes being numbered by means of menus.

9. A probing device for a Thin-Film Transistor Liquid Crystal Display (TFT-LCD) substrate, comprising a device body, a circuit board mounted on the device body, a plurality of motors mounted on the device body, and a plurality of probe pins respectively mounted to the motors, the motors and the probe pins being arranged in a one-to-one corresponding manner, the circuit board comprising a programmable logic controller and a man-machine interface terminal electrically connected to the programmable logic controller, the plurality of motors and the plurality of probe pins being electrically connected to the programmable logic controller, the plurality of probe pins being set at locations corresponding to locations of panel inspection signal input pads of TFT substrates of various sizes, the programmable logic controller using the motors to control the elevation and lowering of the probe pins;

wherein the programmable logic controller comprises a central processing unit, a storage unit electrically connected to the central processing unit, a communication port electrically connected to the central processing unit, and a power supply module electrically connected to the central processing unit, the plurality of motors and the plurality of probe pins being electrically connected to the central processing unit, the man-machine interface terminal being electrically connected by the communication port to the programmable logic controller;

wherein the storage unit stores manners of motor driving corresponding to various sizes of TFT substrate;

wherein the man-machine interface terminal comprises a pushbutton module electrically connected to the central processing unit and a display module electrically connected to the central processing unit, the pushbutton module functioning for setting and selecting the motor driving manners, the display module providing assistance to the setting and selecting of the motor driving manners;

wherein the selection of the motor driving manners is carried out through a menu;

wherein the motor driving manners are set up by sequentially numbering the plurality of motors and the plurality of probe pins;

wherein the motor and the probe pin mounted on the motor that correspond to the location of the same panel inspection signal input pad are of the same number; and wherein the motor driving manners are set up that numbering of the modes is made, according to the motors and the probe pins that correspond to different sizes of TFT substrate so that the motors and the probe pins that correspond to the same size of TFT substrate are grouped together as a mode, these modes being numbered by means of menus.

* * * * *